US012723442B2

(12) United States Patent
Ichiki et al.

(10) Patent No.: US 12,723,442 B2
(45) Date of Patent: Sep. 1, 2026

(54) BACK DOOR LOCK MOUNTING STRUCTURE

(71) Applicant: TOYOTA JIDOSHA KABUSHIKI KAISHA, Toyota (JP)

(72) Inventors: Yosuke Ichiki, Miyoshi (JP); Yoshiki Nagataki, Susono (JP); Shinji Sakurashita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 18/898,905

(22) Filed: Sep. 27, 2024

(65) Prior Publication Data

US 2025/0109613 A1 Apr. 3, 2025

(30) Foreign Application Priority Data

Oct. 3, 2023 (JP) ................................. 2023-172315

(51) Int. Cl.
*E05B 79/04* (2014.01)
*B60J 5/10* (2006.01)

(52) U.S. Cl.
CPC ............... *E05B 79/04* (2013.01); *B60J 5/107* (2013.01)

(58) Field of Classification Search
CPC ...... E05B 79/04; E05B 83/18; E05B 17/0012; E05B 79/00; E05B 79/02; B60J 5/107; B60J 5/10; Y10T 292/62; Y10T 292/1082; Y10S 292/53; Y10S 292/54; Y10S 292/64; Y10S 292/42
See application file for complete search history.

(56) References Cited

U.S. PATENT DOCUMENTS 4,982,984 A * 1/1991 Yokota .................... E05B 81/22 292/201
6,168,216 B1 * 1/2001 Nakajima ............... E05B 81/16 292/216
6,692,057 B2 * 2/2004 Igarashi ................... B60J 5/107 296/76
7,618,083 B2 * 11/2009 Munenaga ............... B60J 5/101 296/146.8
7,770,946 B2 * 8/2010 Kouzuma ............... E05B 81/20 292/216
8,690,220 B2 * 4/2014 Tsukiyama ........... B62D 35/007 296/106
9,499,032 B2 * 11/2016 Ikeda ....................... B60J 5/101
(Continued)

FOREIGN PATENT DOCUMENTS

CN 103043107 A * 4/2013 ........... B62D 25/105
CN 105539097 A * 5/2016 ................ B60J 5/10
(Continued)

OTHER PUBLICATIONS

KR19980048991 USPTO machine translation (Year: 2026).*

*Primary Examiner* — Steven A Tullia
(74) *Attorney, Agent, or Firm* — Dinsmore & Shohl LLP

(57) ABSTRACT

The back door lock mounting structure includes a back door having a front wall, a rear wall, and a bottom wall; a back door lock configured to be disposed in a door inner space between the front wall and the rear wall; and a bracket configured to be mounted to the back door lock and fastened to the front wall, the bracket has a fastening portion configured to be disposed on the front wall and fastened to the front wall outside the door inner space.

3 Claims, 5 Drawing Sheets

(56) References Cited

U.S. PATENT DOCUMENTS

| | | | | |
|---|---|---|---|---|
| 11,712,950 | B2 * | 8/2023 | Miyake | B60J 5/107 296/146.8 |
| 2003/0173796 | A1 * | 9/2003 | Harima | B60J 5/101 296/146.7 |
| 2007/0040391 | A1 * | 2/2007 | Fujihara | E05B 81/20 292/201 |
| 2014/0327250 | A1 * | 11/2014 | Goto | E05B 85/02 292/194 |
| 2017/0174058 | A1 * | 6/2017 | Miyake | B60J 5/101 |

FOREIGN PATENT DOCUMENTS

| | | | | |
|---|---|---|---|---|
| CN | 107060536 A | * | 8/2017 | E05B 83/18 |
| CN | 206734031 U | * | 12/2017 | B60J 5/10 |
| CN | 107444085 B | * | 2/2020 | B60J 5/10 |
| CN | 212171898 U | * | 12/2020 | B60J 5/10 |
| CN | 113846914 A | * | 12/2021 | B60J 5/107 |
| CN | 216733868 U | * | 6/2022 | B60J 5/10 |
| CN | 114987161 A | * | 9/2022 | E05B 83/18 |
| CN | 217396193 U | * | 9/2022 | E05B 85/00 |
| CN | 218881894 U | * | 4/2023 | E05B 79/02 |
| DE | 102011121592 A1 | * | 6/2013 | E05B 79/04 |
| DE | 10144166 C5 | * | 9/2013 | E05B 77/34 |
| FR | 3094998 A1 | * | 10/2020 | E05B 79/02 |
| JP | H0960372 A | * | 3/1997 | B60J 5/10 |
| JP | H1024736 A | * | 1/1998 | E05B 83/36 |
| JP | H11-93919 A | | 4/1999 | |
| JP | 2001049924 A | * | 2/2001 | E05B 81/20 |
| JP | 2001171353 A | * | 6/2001 | B60J 5/10 |
| JP | 2001225641 A | * | 8/2001 | B60J 5/10 |
| JP | 3334740 B2 | * | 10/2002 | E05B 65/19 |
| JP | 2006298329 A | * | 11/2006 | B60J 5/10 |
| JP | 2009023480 A | * | 2/2009 | B60J 5/10 |
| JP | 4676835 B2 | * | 4/2011 | B60J 5/10 |
| JP | 4712855 B2 | * | 6/2011 | B60S 1/583 |
| JP | 2011148463 A | * | 8/2011 | B60J 5/10 |
| JP | 2012-206614 A | | 10/2012 | |
| JP | 5056234 B2 | * | 10/2012 | B60J 5/10 |
| JP | 5149142 B2 | * | 2/2013 | B60J 5/10 |
| JP | 5320647 B2 | * | 10/2013 | E05B 65/20 |
| JP | 2015151103 A | * | 8/2015 | B60J 5/10 |
| JP | 2015-218564 A | | 12/2015 | |
| JP | 2017047872 A | * | 3/2017 | B60J 5/107 |
| JP | 6150696 B2 | * | 6/2017 | B60J 5/101 |
| JP | 6232322 B2 | * | 11/2017 | B60J 5/00 |
| JP | 2017210175 A | * | 11/2017 | B60J 5/10 |
| JP | 2017223034 A | * | 12/2017 | E05B 83/18 |
| JP | 2018165113 A | * | 10/2018 | B60J 5/10 |
| JP | 6708976 B2 | * | 6/2020 | B60J 5/10 |
| JP | 6969277 B2 | * | 11/2021 | E05B 83/18 |
| JP | 2021-195976 A | | 12/2021 | |
| JP | 7750134 B2 | * | 10/2025 | E05B 83/16 |
| KR | 19980021278 U | * | 7/1998 | E05B 83/36 |
| KR | 19980041821 U | * | 9/1998 | B60J 5/0416 |
| KR | 19980048991 U | * | 10/1998 | E05B 83/18 |
| KR | 100380385 B1 | * | 4/2003 | E05B 83/18 |
| WO | WO-2020213199 A1 | * | 10/2020 | B60J 5/00 |

* cited by examiner

BACK DOOR LOCK MOUNTING STRUCTURE

CROSS REFERENCE TO RELATED APPLICATION

This application claims priority to Japanese Patent Application No. 2023-172315 filed on Oct. 3, 2023, which is incorporated herein by reference in its entirety including the specification, claims, drawings, and abstract.

TECHNICAL FIELD

This specification discloses a back door lock mounting structure.

BACKGROUND

A back door lock that locks the back door in a closed state is mounted to the back door of the vehicle. The back door lock locks the back door by engaging the meshing mechanism with the striker on the vehicle body side. Such a back door lock is normally disposed in an internal space of the back door (hereinafter referred to as a "door inner space") and fastened to a bottom wall and a front wall of the back door. Patent Document 1 discloses such a backdoor lock.

When assembling the back door lock, the operator causes the back door lock to enter the door internal space from a mounting opening formed in the front wall. Then, the operator positions the back door lock while changing a posture of the back door lock in the door inner space.

Here, a bracket extending forward from the back door lock is mounted to the back door lock. The end of the bracket is fastened to the front wall of the back door. In the case of a conventional back door lock, the bracket is fastened to the front wall in a state of being completely accommodated in the inner space of the door. In this case, when the posture of the back door lock is changed inside the door inner space, there is a problem that the bracket easily interferes with the front wall or the rear wall. In order to avoid such a problem, the thickness of the door internal space is conventionally increased. However, as the door inner space becomes thicker, the vehicle inner space becomes narrower.

Therefore, the present specification discloses the back door lock mounting structure capable of making the door inner space thinner.

CITATION LIST

PATENT DOCUMENT 1: JP.2015-218564.A

SUMMARY

Aback door lock mounting structure disclosed herein comprises: a back door having a front wall, a rear wall, and a bottom wall; a back door lock configured to be disposed in a door inner space between the front wall and the rear wall; and a bracket configured to be mounted to the back door lock and fastened to the front wall, wherein the bracket has a fastening portion configured to be disposed on the front wall and fastened to the front wall outside the door inner space.

With this configuration, when mounting the back door lock, the operator can pull the back door lock forward to a position where the rear end of the back door lock does not interfere with the rear wall of the back door. Thus, even when the thickness of the door inner space is reduced, the back door lock can be easily mounted.

The front wall may have a mounting opening that allows the back door lock to pass therethrough, the bracket may be configured to be fastened to the front wall at a peripheral edge of the mounting opening, and a fastening position where the bracket and the back door lock may be fastened is closer to a center of the mounting opening than a fastening position where the bracket and the front wall are fastened.

With this configuration, since the bracket is less likely to interfere with the front wall, the worker can more easily mount the back door lock.

The front wall may have a door-side fastening hole through which a fastening bolt is to be inserted, the fastening portion may have a bracket-side fastening hole through which the fastening bolt is to be inserted, and the bracket-side fastening hole may be larger than the door-side fastening hole.

With this configuration, both the door-side fastening hole and the bracket-side fastening hole can be visually recognized when viewed from the vehicle front side. As a result, the worker can more easily mount the back door lock.

The back door lock may be configured to be fastened to the bottom wall of the back door at a position of the back door lock below a center of the back door lock in a longitudinal direction, and the bracket may be configured to be fastened to the front wall at a position of the back door lock above the center of the back door lock in the longitudinal direction.

With this configuration, the fastening position of the upper portion is separated from the fastening position of the lower portion. As a result, the rotation and thus the vibration of the back door lock are effectively prevented.

According to a technology disclosed in this specification, the door inner space can be made thinner.

BRIEF DESCRIPTION OF DRAWINGS

Embodiment(s) of the present disclosure will be described based on the following figures, wherein.

DESCRIPTION OF EMBODIMENT

Figure 1:
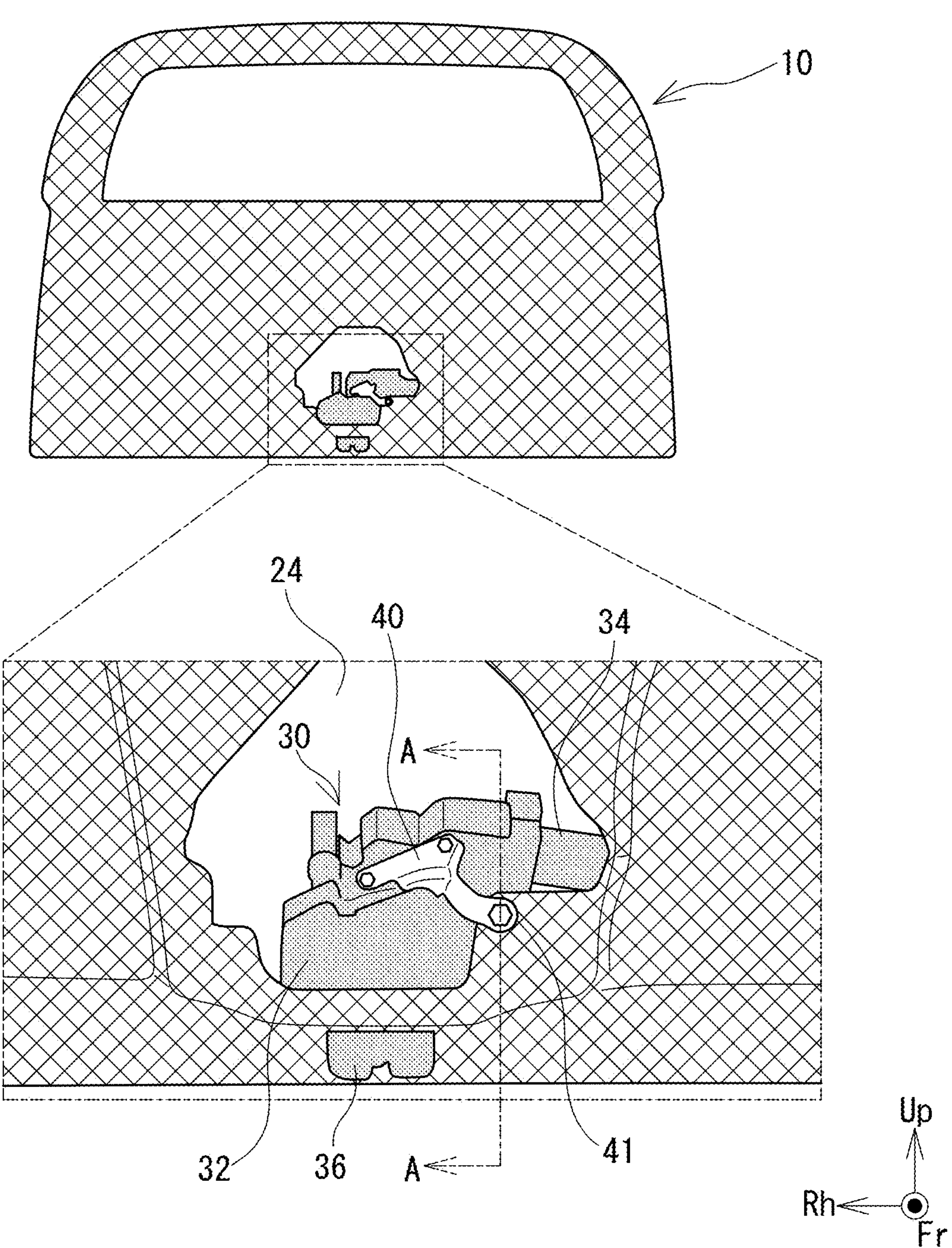
FIG. 1 is a schematic view of a back door of a vehicle as viewed from the inside of the vehicle.
Figure 2:
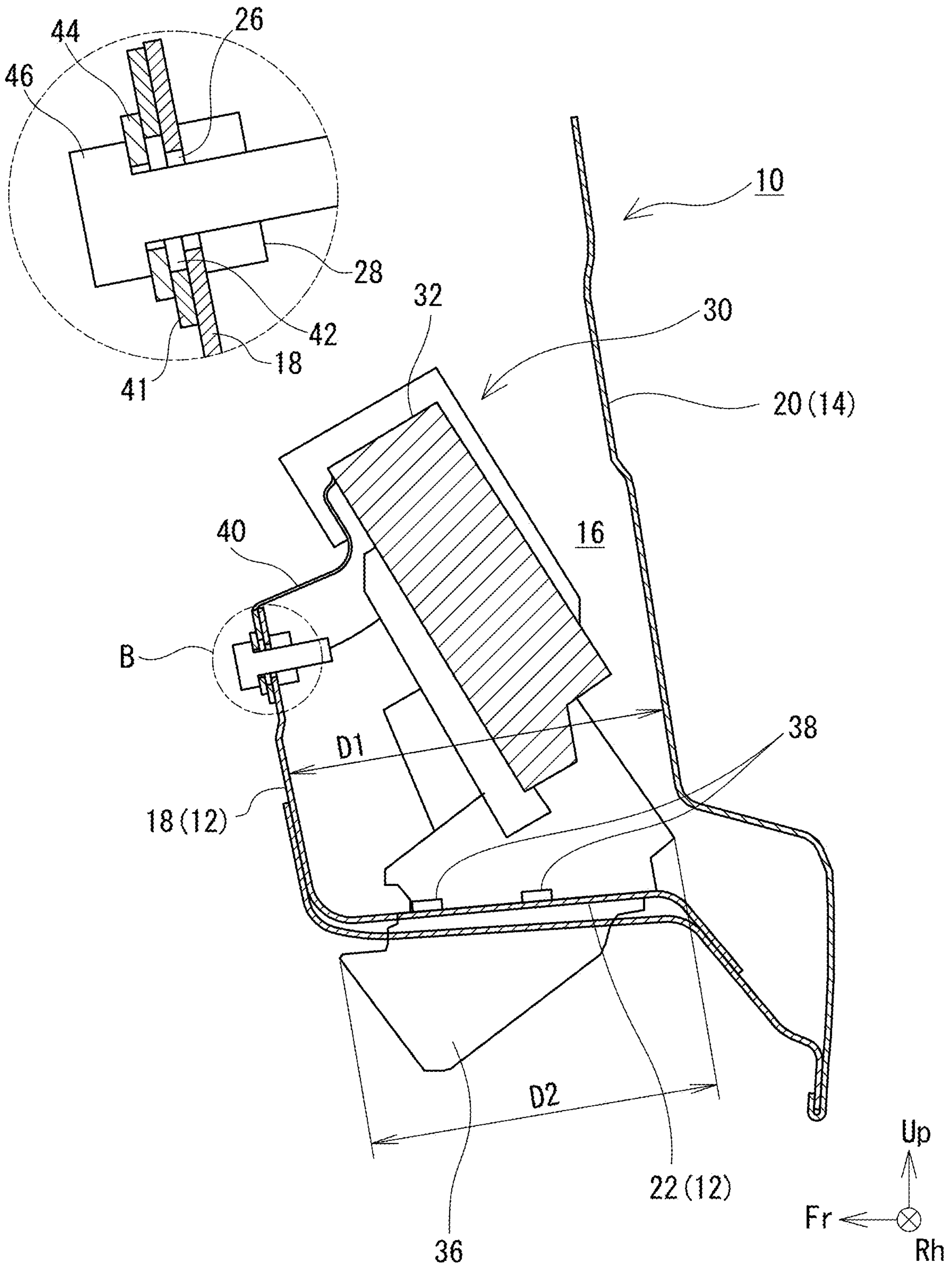
FIG. 2 is a cross-sectional view taken along line A-A of FIG. 1.

Hereinafter, a mounting structure of the back door lock 30 will be described with reference to the drawings. FIG. 1 is a schematic view of a back door 10 of a vehicle as viewed from the inside of the vehicle. FIG. 2 is a cross-sectional view taken along line A-A of FIG. 1. As shown in FIG. 2, the back door 10 is configured by combining an inner panel 12 and an outer panel 14. The inner panel 12 forms a front wall 18 and a bottom wall 22 of the back door 10, and the outer panel 14 forms a rear wall 20 of the back door 10. A door inner space 16 having a predetermined thickness D1 exists between the front wall 18 and the rear wall 20. Naturally, the smaller the thickness D1 of the door inner space 16 is, the wider the luggage compartment of the vehicle is.

As shown in FIG. 1, a mounting opening 24 is formed in a lower portion of the front wall 18. The mounting opening 24 is an opening that allows passage of a back door lock 30 described later. A bottom opening (not shown) is formed in the bottom wall 22. The bottom opening is an opening into which a part of the back door lock 30 is inserted. The larger the mounting opening 24 and the bottom opening are, the lower the strength of the back door 10 is. Therefore, the mounting opening 24 and the bottom opening are small as long as the back door lock 30 can be assembled.

The back door lock 30 is a device that locks the back door 10 in a closed state. The back door lock 30 has a meshing mechanism (not shown) that engages with a striker (not shown) provided on the vehicle body, and the back door 10 is locked in a closed state by the meshing mechanism engaging with the striker. The meshing mechanism is incorporated in a main body 36 provided at a lower portion of the back door lock 30. A part of the main body 36 passes through the bottom opening and protrudes downward from the bottom wall 22. A motor 34 that outputs power, a gear case 32 that incorporates a plurality of gears, and the like are disposed on the upper side of the main body 36. A fastening plate (not shown) extends from the main body 36 in the vehicle width direction. The fastening plate is screwed and fastened to the bottom wall 22 of the back door 10 by a lower fastening bolt 38. As is clear from FIG. 2, the main body 36, i.e., the lower portion of the back door lock 30, protrudes more forward than the gear case 32, i.e., the upper portion of the back door lock 30.

A bracket 40 is mounted to the front surface of the gear case 32. The bracket 40 is an arm-shaped member extending from the front surface of the gear case 32 toward the front of the vehicle. An end of the bracket 40 serves as a fastening portion 41 fastened to the front wall 18 of the back door 10. As shown in FIG. 2, a bracket-side fastening hole 42 is formed in the fastening portion 41. A door-side fastening hole 26 is formed in the front wall 18 of the back door 10. Further, a weld nut 28 disposed concentrically with the door-side fastening hole 26 is fixed to the back surface of the front wall 18. The bracket 40 is fastened to the front wall 18 by the upper fastening bolt 46 in a state in which the bracket-side fastening hole 42, the door-side fastening hole 26, and the washer 44 are superposed so as to be concentric. As is clear from FIG. 2, in the present example, the fastening portion 41 of the bracket 40 protrudes to the outside of the door inner space 16. In other words, the fastening portion 41 of the bracket 40 is located in front of the front wall 18 of the back door 10. With this configuration, the thickness D1 of the door inner space 16 can be reduced, which will be described later.

Here, as is clear from the above description, the lower portion of the back door lock 30 is fastened to the bottom wall 22 of the back door 10 in the vertical direction by the lower fastening bolt 38. The upper portion of the back door lock 30 is fastened to the front wall 18 of the back door 10 in the front-rear direction by an upper fastening bolt 46. When the distance from the lower fastening position to the upper fastening position is short, the back door lock 30 is likely to rotate, and vibration is likely to occur. Therefore, the upper fastening position is largely separated from the lower fastening position. Accordingly, the rotation of the back door lock 30 is effectively suppressed, and vibration can be effectively prevented. As shown in FIG. 2, when the back door lock 30 is fastened to the back door 10, the back door lock 30 is slightly inclined forward. Hereinafter, the posture of the back door lock 30 in the fastened state is referred to as a “fastened posture”.

When the back door lock 30 is assembled to the back door 10, the operator causes the back door lock 30 to enter the door inner space 16 through the mounting opening 24. Thereafter, the operator moves the back door lock 30 downward in the door inner space 16 so that the main body 36 passes through the bottom opening. At this time, the size of the bottom opening is limited. Therefore, when the back door lock 30 is in the fastening posture, the main body 36 cannot pass through the bottom opening. Therefore, the operator causes the back door lock 30 to enter the door inner space 16 in a state of being inclined toward the vehicle front side with respect to the fastening posture. Then, the operator moves the back door lock 30 downward while finely adjusting the posture of the back door lock 30.

Figure 3:
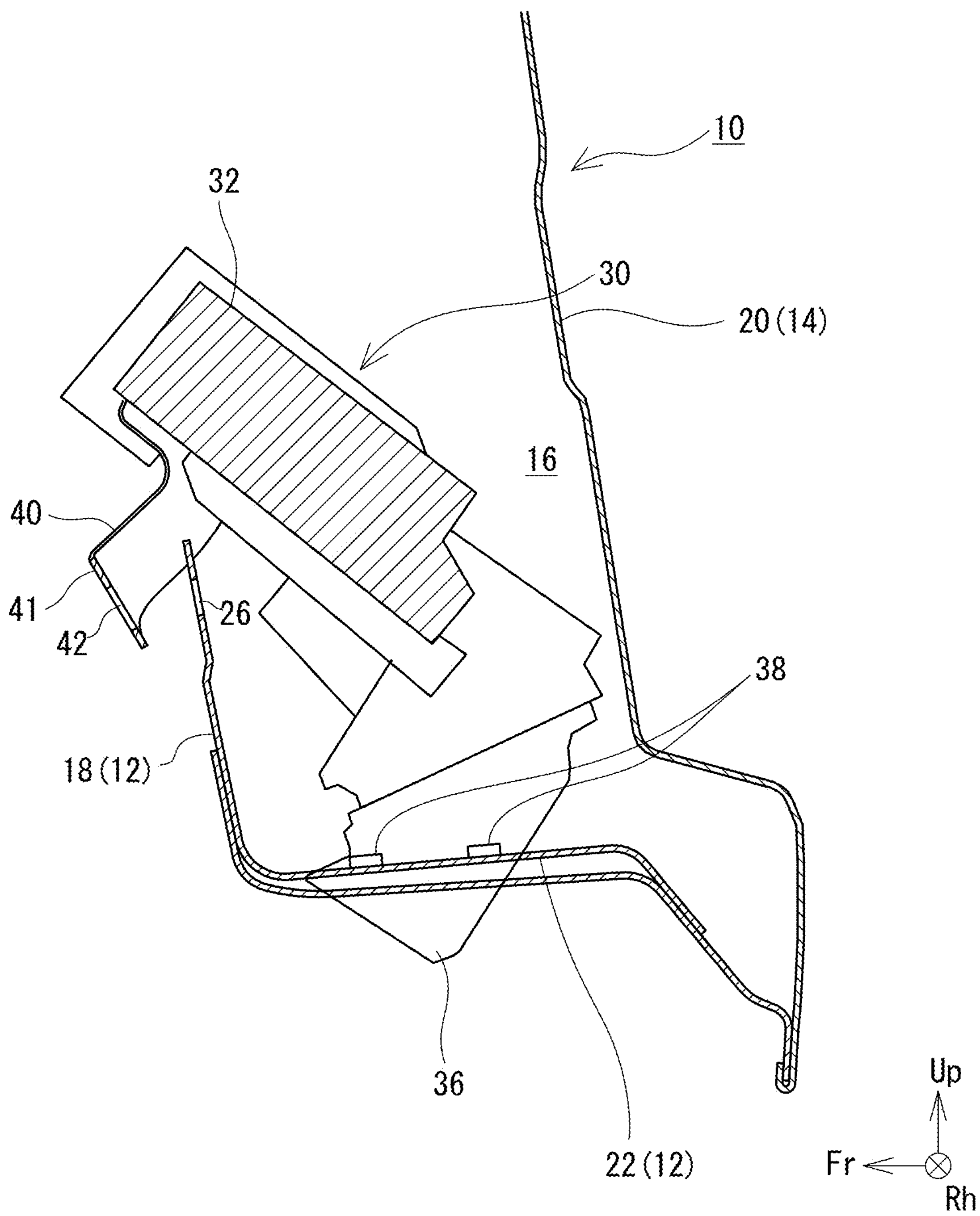
FIG. 3 is a view showing how the back door lock is mounted.

Here, as described above, in this example, the fastening portion 41 of the bracket 40 is located outside the door inner space 16. With this configuration, it is possible to prevent interference between the back door 10 and the back door lock 30 during the assembling operation while suppressing the thickness of the back door 10. This will be described. FIG. 3 is a view showing how the back door lock 30 is assembled. Further, FIG. 4 is a view showing a state of the assembling work of the back door lock 30* of the comparative example.

When the back door lock 30 is assembled to the door lock, as described above, it is necessary to change the posture of the back door lock 30 in the door inner space 16. In this example, the fastening portion 41 of the bracket 40 is finally located outside the back door lock 30. Therefore, as shown in FIG. 3, there is no problem even if most of the bracket 40 protrudes to the outside of the door inner space 16 in the assembling process. Thus, the operator can pull the back door lock 30 to the vehicle front side to a position where the rear end of the back door lock 30 does not abut against the rear wall of the back door 10.

Figure 4:
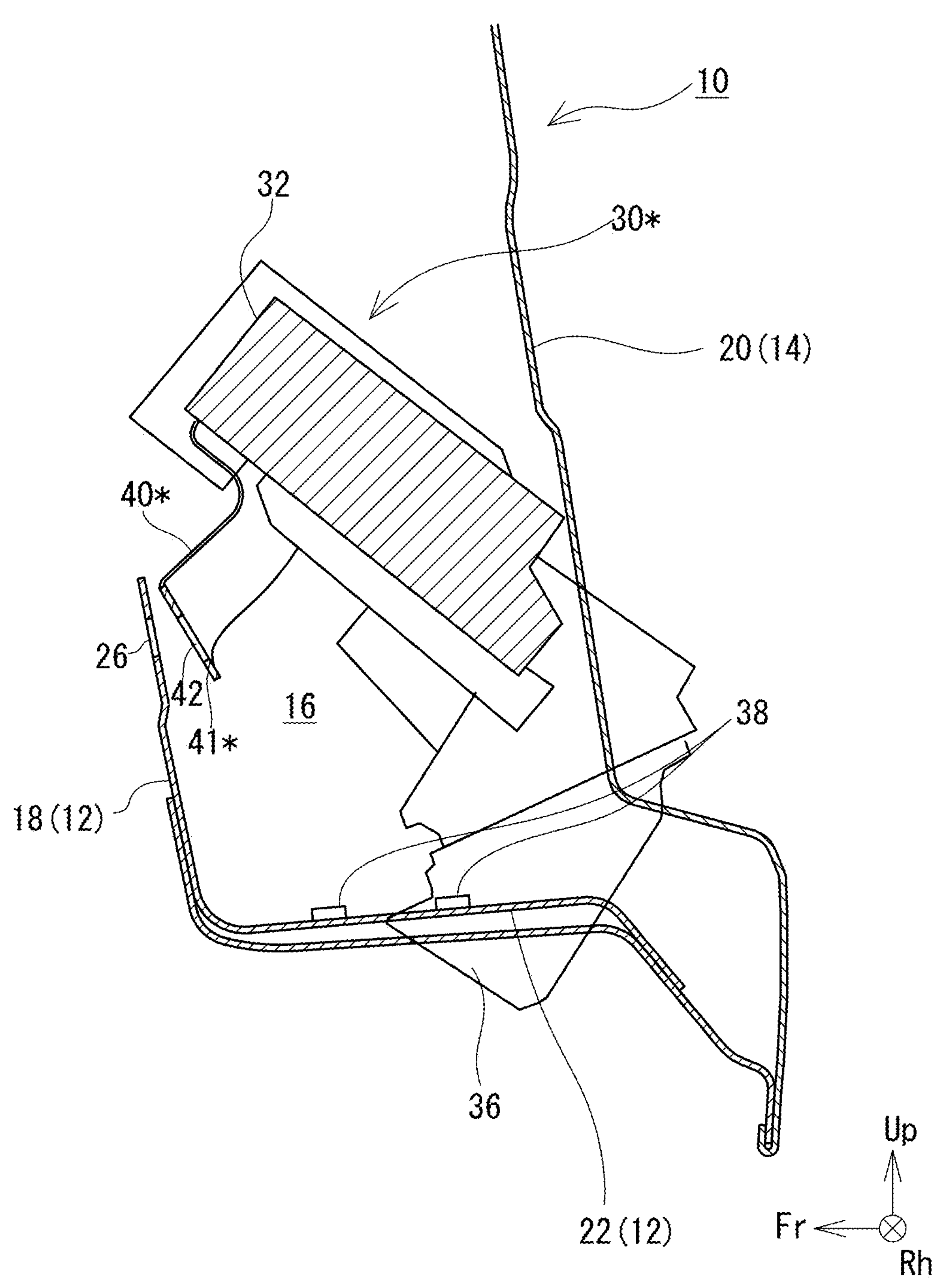
FIG. 4 is a view showing how a back door lock of a comparative example is assembled.

On the other hand, as shown in FIG. 4, the back door lock 30* of the comparative example has substantially the same configuration as the back door lock 30 of the present example. However, the fastening portion 41* of the back door lock 30* of the comparative example is fastened to the front wall 18 in a state of being located inside the door inner space 16. In other words, in the case of the back door lock 30* of the comparative example, the fastening portion 41* is located on the vehicle rear side of the front wall 18.

When the back door lock 30* is assembled to the back door 10, it is necessary to prevent the bracket 40* from coming out of the door inner space 16 in the assembling process. When the front end position of the bracket 40* is regulated, the rear end position of the back door lock 30* retreats to the rear of the vehicle. Accordingly, the rear end of the back door lock 30* easily interferes with the rear wall 20 of the back door 10. As a result, in the case of the back door lock 30* of the comparative example, it is necessary to increase the thickness D1 of the door inner space 16 in order to enable the back door lock 30* to be assembled.

Figure 5:
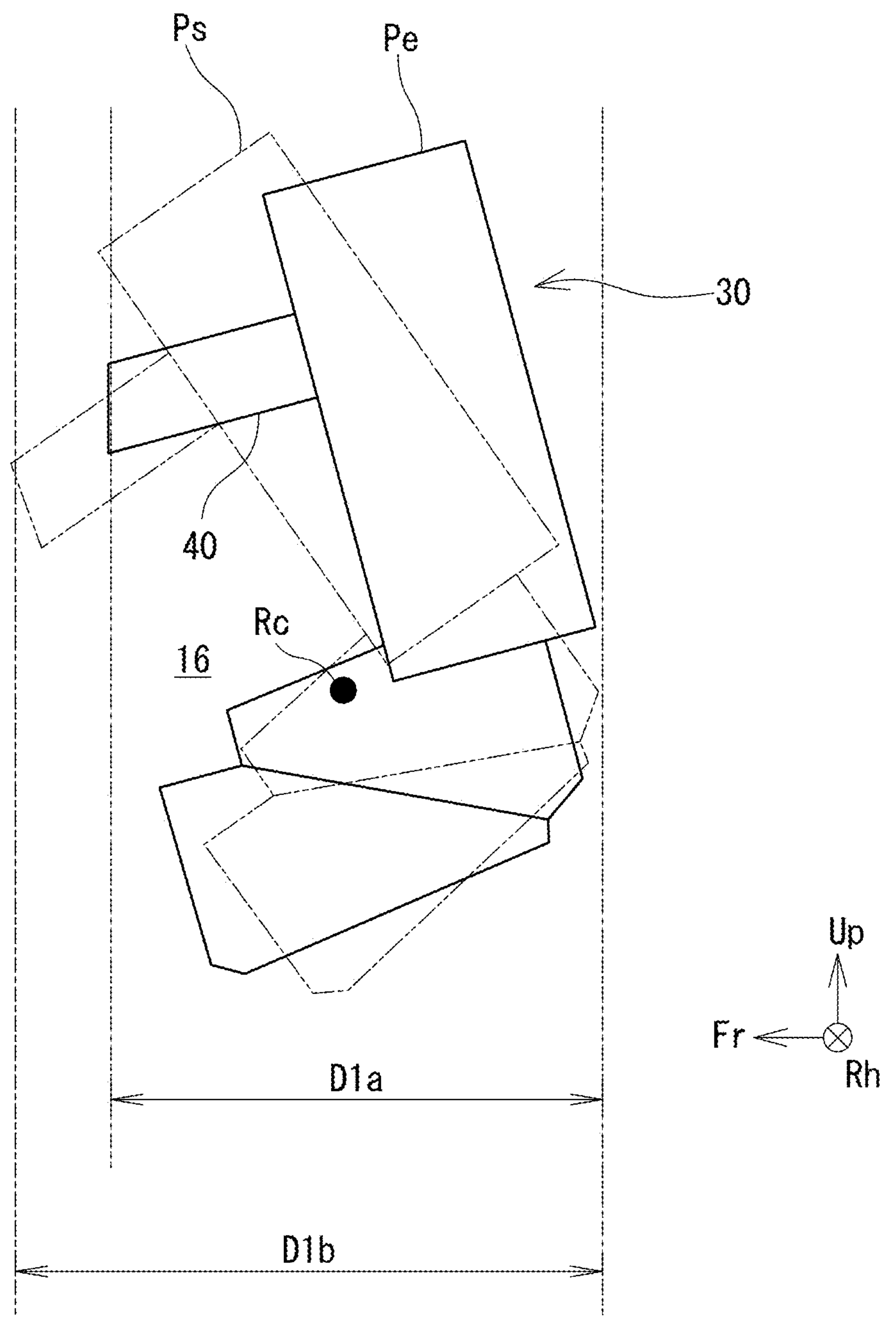
FIG. 5 is a schematic view showing how the back door lock is assembled.

This will be further described using a schematic diagram. FIG. 5 is a schematic view showing how the back door lock 30 is assembled. In the process of assembling the back door lock 30, the back door lock 30 is changed from the initial posture Ps indicated by the one-dot chain line to the fastening posture Pe indicated by the solid line. A black circle in FIG. 5 indicates the rotation center Rc of the posture change.

As described above, when the fastening portion 41 is located outside the door inner space 16 as in the present example, there is no problem even if the fastening portion 41 largely protrudes outside the door inner space 16 in the initial posture Ps. Therefore, in this example, the necessary thickness of the door inner space 16 is D1a in FIG. 5. On the other hand, when the fastening portion 41 is located inside the door inner space 16 as in the comparative example, the fastening portion 41 needs to be located inside the door inner space 16 even in the initial posture Ps. Therefore, in the case of the back door lock 30* of the comparative example, the necessary thickness of the door inner space 16 is D1b in FIG. 5. As is clear from FIG. 5, by positioning the fastening portion 41 outside the door inner space 16, the thickness necessary for the door inner space 16 can be significantly reduced.

The thickness D1b required in the comparative example can be reduced by reducing the distance from the rotation center Rc to the bracket 40. However, when the bracket 40 is brought close to the rotation center Rc, the distance from the upper fastening position (i.e., the upper fastening bolt 46) to the lower fastening position (i.e., the lower fastening bolt 38) becomes smaller. As described above, when the distance is reduced, the back door lock 30 is likely to rotate, and vibration is likely to occur. Therefore, it is difficult to reduce the distance from the rotation center Rc to the bracket 40, and it is difficult to reduce the necessary thickness D1b in the back door lock 30* of the comparative example.

On the other hand, in this example, as described repeatedly, a part of the bracket 40 is positioned outside the door inner space 16. Therefore, the thickness of the door inner space 16 can be reduced while ensuring a sufficient distance from the upper fastening portion to the lower fastening portion. For example, in the present example, the thickness D1 of the door inner space 16 is 1.2 times or less the thickness D2 of the lower portion of the back door lock 30. As shown in FIG. 2, the "thickness D1 of the door inner space 16" is the shortest distance from the front wall 18 to the rear wall 20 in the lower portion of the door inner space 16. Further, the "lower portion of the back door lock 30" is a portion below the center of the back door lock 30 in the up-down direction. Further, the "thickness D2 of the lower portion of the back door lock 30" is a dimension in the first direction of the lower portion of the back door lock 30 when the thickness direction of the door inner space 16 is the first direction.

The back door lock 30 is assembled from the front side of the vehicle. As shown in FIG. 2, in the present embodiment, the bracket-side fastening hole 42 is larger than the door-side fastening hole 26. Therefore, even when the bracket-side fastening hole 42 and the door-side fastening hole 26 overlap each other, they can be easily visually recognized from the vehicle front side. Thus, the fastening work of the bracket 40 can be facilitated.

As is clear from FIG. 1, the fastening position between the bracket 40 and the back door lock 30 is closer to the center of the mounting opening 24 than the fastening position between the bracket 40 and the front wall 18. In other words, the fastening portion 41 of the bracket 40 is close to the peripheral edge of the mounting opening 24, but is apart from the peripheral edge. Accordingly, interference between the bracket 40 and the front wall 18 is effectively prevented.

Note that all of the configurations described above are examples, and other configurations may be changed as long as the mounting structure of the back door lock 30 includes a back door having a front wall, a rear wall, and a bottom wall; a back door lock configured to be disposed in a door inner space between the front wall and the rear wall; and a bracket configured to be mounted to the back door lock and fastened to the front wall, the bracket has a fastening portion configured to be disposed on the front wall and fastened to the front wall outside the door inner space. For example, the shapes of the back door lock 30 and the bracket 40 may be changed as appropriate. In the above description, the thickness D1 of the door inner space 16 is 1.2 times or less the thickness D2 of the lower portion of the back door lock 30. However, it should be understood that the thickness D1 of the door inner space 16 may be $D1>1.2\times D2$.

REFERENCE SIGNS LIST

10 back door, 12 inner panel, 14 outer panel, 16 door inner space, 18 front wall, 20 rear wall, 22 bottom wall, 24 mounting opening, 26 door-side fastening hole, 28 weld nut, 30, 30* back door lock, 32 gear case, 34 motor, 36 main body, 38 lower fastening bolt, 40, 40* bracket, 41, 41* fastening portion, 42 bracket-side fastening hole, 44 washer, 46 upper fastening bolt, 46 fastening bolt.

The invention claimed is:

1. A back door lock mounting structure comprising:

a back door having a front wall, a rear wall, and a bottom wall;

a back door lock configured to be disposed in a door inner space between the front wall and the rear wall; and a bracket configured to be mounted to the back door lock and fastened to the front wall, wherein the bracket has a fastening portion configured to be disposed on an outer surface of the front wall opposite the door inner space, the fastening portion fastened to the front wall, wherein the back door lock is configured to be fastened to the bottom wall of the back door at a position of the back door lock below a center of the back door lock in a longitudinal direction, and wherein the bracket is configured to be fastened to the front wall at a position of the back door lock above the center of the back door lock in the longitudinal direction.

2. The back door lock mounting structure according to claim 1, wherein the front wall has a mounting opening that allows the back door lock to pass therethrough, the bracket is configured to be fastened to the front wall at a peripheral edge of the mounting opening, and a first fastening position where the bracket and the back door lock are fastened is closer to a center of the mounting opening than a second fastening position where the bracket and the front wall are fastened.

3. The back door lock mounting structure according to claim 1, wherein the front wall has a door-side fastening hole through which a fastening bolt is to be inserted, the fastening portion has a bracket-side fastening hole through which the fastening bolt is to be inserted, and the bracket-side fastening hole is larger than the door-side fastening hole.

* * * * *